United States Patent
Murayama et al.

(10) Patent No.: US 8,986,861 B2
(45) Date of Patent: Mar. 24, 2015

(54) ELECTRICITY ACCUMULATION DEVICE

(71) Applicant: Tokai Rubber Industries, Ltd., Aichi-ken (JP)

(72) Inventors: Masaru Murayama, Komaki (JP); Atsushi Muramatsu, Komaki (JP); Yuuki Saitou, Komaki (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 13/687,554

(22) Filed: Nov. 28, 2012

(65) Prior Publication Data
US 2013/0089765 A1  Apr. 11, 2013

Related U.S. Application Data

(63) Continuation of application No. PCT/JP2011/076976, filed on Nov. 24, 2011.

(30) Foreign Application Priority Data

Nov. 30, 2010  (JP) .................. 2010-266909

(51) Int. Cl.
*H01M 2/00* (2006.01)
*H01M 10/42* (2006.01)
(Continued)

(52) U.S. Cl.
CPC ............ *H01M 10/425* (2013.01); *H01G 11/14* (2013.01); *H01G 11/78* (2013.01);
(Continued)

(58) Field of Classification Search
CPC ..... H01G 11/14; H01G 11/78; H01G 9/0003; H01M 10/425; H01M 10/48; H01M 2/1016; H01M 10/443; H01M 10/445; H01M 10/5026; Y02E 60/13; Y02T 10/7022

USPC ............ 429/57, 61, 66–67, 90, 92, 121–122, 429/169
See application file for complete search history.

(56) References Cited

U.S. PATENT DOCUMENTS

2003/0118900 A1* 6/2003 Otohata .................. 429/162
2008/0100046 A1* 5/2008 Hayakawa et al. ........... 280/735
(Continued)

FOREIGN PATENT DOCUMENTS

JP             6-52901         2/1994
JP          2002-289265        10/2002
(Continued)

*Primary Examiner* — Patrick Ryan
*Assistant Examiner* — Ben Lewis
(74) *Attorney, Agent, or Firm* — Greenblum & Bernstein, P.L.C.

(57) ABSTRACT

An electricity accumulation device includes an electricity accumulation element, an outer jacket material configured to house the electricity accumulation element, and a deformation sensor disposed on an expansive surface of the outer jacket material. The deformation sensor includes a sensor membrane having a base material made of an elastomer or a resin and conductive fillers filling the base material, the sensor membrane being subjected to bending deformation along with expansion of the outer jacket material, and a pair of electrodes connected to the sensor membrane. A three-dimensional conductive path is formed in the sensor membrane through contact between the conductive fillers. An electric resistance is increased along with an increase in amount of deformation of the sensor membrane from a natural state. The electricity accumulation device senses expansion of the outer jacket material on the basis of variations in electric resistance along with bending deformation of the sensor membrane.

4 Claims, 15 Drawing Sheets

(51) Int. Cl.
*H01G 11/14* (2013.01)
*H01G 11/78* (2013.01)
*H01M 2/10* (2006.01)
*H01M 10/48* (2006.01)
*H01G 9/00* (2006.01)

(52) U.S. Cl.
CPC ............ *H01M2/1016* (2013.01); *H01M 10/48* (2013.01); *H01G 9/0003* (2013.01); *Y02T 10/7022* (2013.01); *Y02E 60/13* (2013.01)
USPC .................. 429/61; 429/57; 429/66; 429/67; 429/90; 429/92; 429/121; 429/122

(56) References Cited

U.S. PATENT DOCUMENTS

2009/0199650 A1\* 8/2009 Shimazu et al. ................ 73/777
2010/0068607 A1\* 3/2010 Spare et al. ..................... 429/90

FOREIGN PATENT DOCUMENTS

| JP | 2005-251470 | 9/2005 |
| JP | 2008-70327 | 3/2008 |
| JP | 2009-76265 | 4/2009 |
| JP | 2009-279211 | 12/2009 |

\* cited by examiner

ELECTRICITY ACCUMULATION DEVICE

CLAIM FOR PRIORITY

This application is a continuation of PCT/JP2011/076976 filed Nov. 24, 2011, and claims the priority benefit of Japanese Application No. 2010-266909, filed Nov. 30, 2010, the contents of which is expressly incorporated by reference in its entirety.

TECHNICAL FIELD

The present invention relates to an electricity accumulation device such as a secondary battery and a capacitor.

BACKGROUND ART

Secondary batteries that can be charged and discharged repeatedly are used in electronic devices such as cellular phones, personal computers, and digital cameras. Electricity accumulation systems for use against momentary voltage drops, electricity accumulation systems mounted on electric vehicles and hybrid electric vehicles, and so forth require an electricity accumulation device that has a high energy capacity and that can be charged and discharged quickly. Examples of such an electricity accumulation device include lithium ion secondary batteries and electric double layer capacitors.

In general, the electricity accumulation device such as a secondary battery and a capacitor includes an electrode laminate in which a positive electrode and a negative electrode are laminated via a separator. The electrode laminate is sealed in an outer jacket material such as a metal case or a laminate film together with an electrolyte solution. In the electricity accumulation device, the electrolyte solution may be decomposed to generate a gas through overcharge or repeated charge and discharge. This may reduce the capacity of the device, or may shorten the life of the device. If the internal pressure is raised by the generated gas, the outer jacket material may be expanded to impair safety. Therefore, there is adopted a scheme in which the temperature, current, voltage, etc. of the electricity accumulation device are measured to stop charge when such values exceed respective prescribed values, for example. A secondary battery including a sensor that senses expansion of the outer jacket material is proposed (see Patent Documents 1 to 3).

RELATED-ART DOCUMENTS

Patent Documents

Patent Document 1: Japanese Patent Application Publication No. 2009-76265 (JP 2009-76265 A)
Patent Document 2: Japanese Patent Application Publication No. 2005-251470 (JP 2009-251470 A)
Patent Document 3: Japanese Patent Application Publication No. 06-52901 (JP 06-52901 A)

SUMMARY OF THE INVENTION

Problem to be Solved by the Invention

In the secondary battery according to Patent Document 1 mentioned above, an overcurrent protection element with an electric resistance that is decreased upon application of a pressure is disposed between the housing and the secondary battery to sense expansion of the secondary battery. Patent Document 2 mentioned above discloses a mechanical switch that is energized when pressed by the outer jacket material, and Patent Document 3 mentioned above discloses a strain gauge, each serving as a sensor configured to sense expansion of the secondary battery.

In the case where the outer jacket material has low rigidity, such as a case where the outer jacket material is made of a laminate film, however, a force from the inside tends to be dispersed, and members disposed outside the outer jacket material are pressed by a small force. Therefore, it is difficult to accurately sense expansion of the outer jacket material using the sensors according to the related art.

The present invention has been made in view of such circumstances, and therefore has an object to provide an electricity accumulation device capable of sensing expansion of an outer jacket material with a simple configuration and at a low cost to achieve a high level of safety.

Means for Solving the Problem (1) The present invention provides an electricity accumulation device characterized by including: an electricity accumulation element; an outer jacket material configured to house the electricity accumulation element; and a deformation sensor disposed on an expansive surface of the outer jacket material, in which the deformation sensor includes a sensor membrane having a base material made of an elastomer or a resin and conductive fillers filling the base material at a filling rate of equal to or more than 30 vol %, the sensor membrane being subjected to bending deformation along with expansion of the outer jacket material, and at least a pair of electrodes connected to the sensor membrane, a three-dimensional conductive path is formed in the sensor membrane through contact between the conductive fillers, an electric resistance is increased along with an increase in amount of deformation of the sensor membrane from a natural state, and expansion of the outer jacket material is sensed on the basis of variations in electric resistance along with bending deformation of the sensor membrane.

The electricity accumulation element of the electricity accumulation device according to the present invention includes a laminate of a positive electrode and a negative electrode, an electrolyte, and so forth forming a secondary battery, a capacitor, or the like. The expansive surface is a surface that is swelled outward by a gas pressure in the case where a gas is generated inside the outer jacket material.

The deformation sensor of the electricity accumulation device according to the present invention includes a sensor membrane having a base material made of an elastomer or a resin. Therefore, the deformation sensor provides excellent processability and a high degree of freedom in shape design. Hence, the deformation sensor can be disposed along the shape of the expansive surface of the outer jacket material. This allows expansion of the outer jacket material to be sensed more accurately. In addition, the sensor membrane is disposed on the expansive surface of the outer jacket material. The sensor membrane is subjected to bending deformation through displacement of the expansive surface. That is, displacement due to expansion of the outer jacket material is directly input to the sensor membrane. Thus, expansion of the outer jacket material can be sensed easily even in the case where displacement of the outer jacket material is small, for example in the initial stage of expansion.

The filling rate of the conductive fillers filling the sensor membrane is based on the volume of the sensor membrane being 100 vol %. Since the sensor membrane is filled with the conductive fillers at a high filling rate of equal to or more than 30 vol %, a three-dimensional conductive path is formed in the sensor membrane in a natural state (non-deformed state) through contact between the conductive fillers. When the sensor membrane is deformed, the conductive fillers repel each other to change the state of contact between the conductive fillers. Then, the contact between the conductive fillers is broken, and the conductive path is cut, which causes an increase in electric resistance. When the sensor membrane restores its natural state, the state of contact between the conductive fillers is recovered, which causes a decrease in electric resistance.

Thus, with the electricity accumulation device according to the present invention, expansion of the outer jacket material can be sensed on the basis of variations in electric resistance along with bending deformation of the sensor membrane. Thus, the safety of the electricity accumulation device is improved. In addition, the life of the electricity accumulation device can be enhanced by controlling charge and discharge utilizing the behavior of expansion of the outer jacket material. In the electricity accumulation device according to the present invention, the sensor membrane is not necessarily disposed in its natural state. For example, the sensor membrane may be disposed in a state of being subject to bending deformation in advance. In addition, the bending deformation of the sensor membrane caused along with expansion of the outer jacket material includes both bend from a natural state and restoration from a bent state into a natural state.

(2) In the configuration according to (1) above, preferably, the sensor membrane may be disposed to extend from one end to the other end of the expansive surface of the outer jacket material.

In the configuration, the sensor membrane is disposed to extend from one end to the other end of the expansive surface. Therefore, expansion of the outer jacket material can be sensed easily without fault. In the configuration, in addition, the deformation sensor may be disposed on the expansive surface. This facilitates manufacture of the electricity accumulation device. With the deformation sensor formed in a sheet shape, in addition, the size of the electricity accumulation device is not increased even if the deformation sensor is disposed on the expansive surface. Hence, a plurality of the electricity accumulation devices can be laminated to form a module in a space-saving configuration.

In the configuration, the sensor membrane may be disposed on a part of the expansive surface, or may be disposed so as to cover the entire expansive surface. In addition, expansion is easily caused around the center of the expansive surface. That is, the outer jacket material is displaced significantly around the center of the expansive surface. Therefore, in the case where the sensor membrane is disposed on a part of the expansive surface, it is desirable that the sensor membrane should be disposed so as to cover an area around the center of the expansive surface.

(3) In the configuration according to (1) above, preferably, the deformation sensor may include a substrate on which the sensor membrane is disposed, may be disposed with the sensor membrane being on an expansive surface side of the outer jacket material, and may further include a deformation input member disposed on a substrate side and configured to press the sensor membrane together with the outer jacket material along with expansion of the outer jacket material to increase an amount of bending deformation of the sensor membrane.

In the configuration, at least a part of the sensor membrane of the deformation sensor is interposed between the outer jacket material and the deformation input member. When the outer jacket material is expanded, the sensor membrane is pushed against the deformation input member to be subjected to bending deformation. That is, in the configuration, the sensor membrane is subjected to bending deformation mainly through abutment against the deformation input member. Thus, the amount of bending deformation of the sensor membrane is large compared to a case where the sensor membrane is subjected to bending deformation only through expansion of the outer jacket material. This causes a greater increase in electric resistance with respect to displacement of the outer jacket material. That is, the sensitivity of the deformation sensor is enhanced. Thus, expansion of the outer jacket material can be sensed even in the case where displacement of the expansive surface is small.

As discussed above, expansion is easily caused around the center of the expansive surface. Therefore, a pressing force from the deformation input member is applied to the sensor membrane more easily when the sensor membrane is disposed so as to cover an area around the center of the expansive surface. This increases the amount of bending deformation of the sensor membrane. Thus, the sensitivity of the deformation sensor can be enhanced to a greater degree.

The deformation input member may be directly disposed on the outer jacket material, or may be disposed on a different member. In the case where the electricity accumulation device further includes a housing, for example, the deformation input member may be disposed on the housing. In addition, the deformation input member and the deformation sensor may, or may not, contact each other in a state before expansion of the outer jacket material. In the case where the deformation input member and the deformation sensor contact each other in a state before expansion of the outer jacket material, initial expansion of the outer jacket material may be sensed more easily.

(4) In the configuration according to (3) above, preferably, the deformation input member may be a bar member or a string member having a curved surface portion that abuts against the deformation sensor, and the bar member or the string member may be disposed so as to intersect the deformation sensor.

In the configuration, a bar member or a string member is used as the deformation input member. The bar member or the string member is disposed so as to intersect the deformation sensor. This allows bending deformation to be reliably input to the sensor membrane with a simple configuration.

(5) In the configuration according to (1) above, preferably, the expansive surface of the outer jacket material may include a recessed portion, and the sensor membrane may be disposed in a state of being subjected to bending deformation along the recessed portion.

In the configuration, the sensor membrane is disposed in a state of being subjected to bending deformation in the recessed portion in the expansive surface of the outer jacket material. When the outer jacket material is expanded, the recessed portion is displaced closer to a flat state. This allows the sensor membrane to restore its natural state before being subjected to bending deformation. Expansion of the outer jacket material is sensed on the basis of variations in electric resistance of the sensor membrane caused in the course of the sensor membrane restoring its natural state. In the configuration, in addition, the deformation sensor may be disposed in the recessed portion in the expansive surface. This facilitates manufacture of the electricity accumulation device. Thus, according to the configuration, expansion of the outer jacket material can be sensed conveniently and at a low cost utilizing the recessed portion in the expansive surface. In addition, the deformation sensor is disposed in the recessed portion in the expansive surface, and therefore the electricity accumulation device can be formed compactly. Hence, a plurality of the electricity accumulation devices can be laminated to form a module in a space-saving configuration.

In the case where a laminate film is used as the outer jacket material, for example, vacuuming is performed after the electricity accumulation element is covered by the laminate film. This allows the laminate film to closely adhere along the shape of the electricity accumulation element. Thus, the recessed portion can be formed conveniently in the expansive surface of the outer jacket material by forming a recessed portion in a part of the electricity accumulation element in advance, for example.

(6) In the configuration according to (1) above, preferably, the outer jacket material may be made of a film member, the expansive surface of the outer jacket material may include a seal portion at which end portions of the film member are affixed to each other, the sensor membrane may be disposed on the expansive surface and the seal portion which is continuous with the expansive surface, and the sensor membrane may be subjected to bending deformation as the outer jacket material is expanded to cause the seal portion to stand upright.

In the case where the outer jacket material is made of a film member such as a laminate film, one end and the other end of the film member can be affixed to each other by heat-sealing or the like to form a seal. In the configuration, expansion of the outer jacket material is sensed utilizing the seal portion at which end portions of the film member are affixed to each other. That is, the sensor membrane is disposed on the expansive surface and the seal portion which is continuous with the expansive surface. In other words, the sensor membrane is disposed across the expansive surface and the seal portion. When the outer jacket material is expanded, the seal portion stands upright. Consequently, the sensor membrane is bent. Expansion of the outer jacket material is sensed on the basis of variations in electric resistance of the sensor membrane caused in this process. In the configuration, in addition, the deformation sensor may be disposed such that a part of the sensor membrane overlaps the seal portion. This facilitates manufacture of the electricity accumulation device. Thus, according to the configuration, expansion of the outer jacket material can be sensed conveniently and at a low cost utilizing the seal portion. In addition, the deformation sensor is disposed at the seal portion of the expansive surface. Therefore, the size of the electricity accumulation device is not increased even if the deformation sensor is provided. Hence, a plurality of the electricity accumulation devices can be laminated to form a module in a space-saving configuration.

(7) In the configuration according to (1) above, preferably, the electricity accumulation device may further include a housing configured to house the electricity accumulation element, the outer jacket material, and the deformation sensor, and one end of the deformation sensor may be attached to the housing, and the other end of the deformation sensor may be attached to the expansive surface of the outer jacket material.

In the configuration, the deformation sensor is disposed to extend between the housing and the outer jacket material. When the outer jacket material is expanded, a gap between the housing and the outer jacket material is reduced. Consequently, the sensor membrane of the deformation sensor is bent. Expansion of the outer jacket material is sensed on the basis of variations in electric resistance of the sensor membrane caused in this process. Thus, according to the configuration, expansion of the outer jacket material can be sensed conveniently and at a low cost utilizing the housing.

(8) In the configuration according to (1) above, preferably, the base material of the sensor membrane may be a resin, and cracks may be formed in advance in the sensor membrane to extend in such a direction that the conductive path is cut when the sensor membrane is subjected to bending deformation.

The sensor membrane according to the configuration is formed by filling a resin with conductive fillers. As described in (1) above, a three-dimensional conductive path is formed in the sensor membrane through contact between the conductive fillers, and the electric resistance is increased along with an increase in amount of deformation from a natural state. In addition, cracks are formed in advance in the sensor membrane according to the configuration to extend in such a direction that the conductive path is cut when the sensor membrane is subjected to bending deformation. In FIG. 12, a schematic diagram showing as enlarged the vicinity of a part of a crack in the sensor membrane is shown. FIG. 12 is a schematic diagram illustrating the sensor membrane according to the configuration. Hence, FIG. 12 does not limit the shape of the crack, the direction of extension of the crack, the shape of the conductive fillers, or the like in any way. FIG. 12A shows a natural state before bending deformation, and FIG. 12B shows a state after bending deformation.

As shown in FIG. 12A, a sensor membrane 800 includes a resin 801 serving as a base material, conductive fillers 802, and a crack 803. A conductive path P is formed in the sensor membrane 800 through contact between the conductive fillers 802. The crack 803 is formed to extend in a direction intersecting the left-right direction (direction of stretch) in FIG. 12. When the sensor membrane 800 is subjected to bending deformation to be stretched in the left-right direction, the crack 803 is opened as shown in FIG. 12B. Consequently, the contact between the conductive fillers 802 is broken, and the conductive path P is cut. This results an increase in electric resistance. When the sensor membrane 800 restores its original state (the natural state in FIG. 12A), the crack 803 also returns to its original state.

Thus, in the sensor membrane according to the configuration, the conductive path is cut without the need to wait for elastic deformation of the resin when bending deformation is caused (it should be noted, however, that a case where the conductive path is cut by elastic deformation of the resin is not excluded). Thus, a response delay is less likely to be caused. In addition, the conductive path is cut mainly through the opening of the crack. Therefore, even small deformation can be sensed accurately compared to a case where the conductive path is cut only through elastic deformation of the resin. Thus, expansion of the outer jacket material can be sensed even in the case where displacement of the expansive surface is small.

Effects of the Invention

According to the present invention, an electricity accumulation device capable of sensing expansion of an outer jacket material with a simple configuration and at a low cost to achieve a high level of safety can be provided.

BRIEF DESCRIPTION OF THE DRAWINGS

FIG. 12 is a schematic diagram showing as enlarged the vicinity of a part of a crack in a sensor membrane forming a deformation sensor, in which

MODES FOR CARRYING OUT THE INVENTION

Electricity accumulation devices according to embodiments of the present invention will be described below.
<First Embodiment>
[Configuration of Electricity Accumulation Device]

Figure 1:
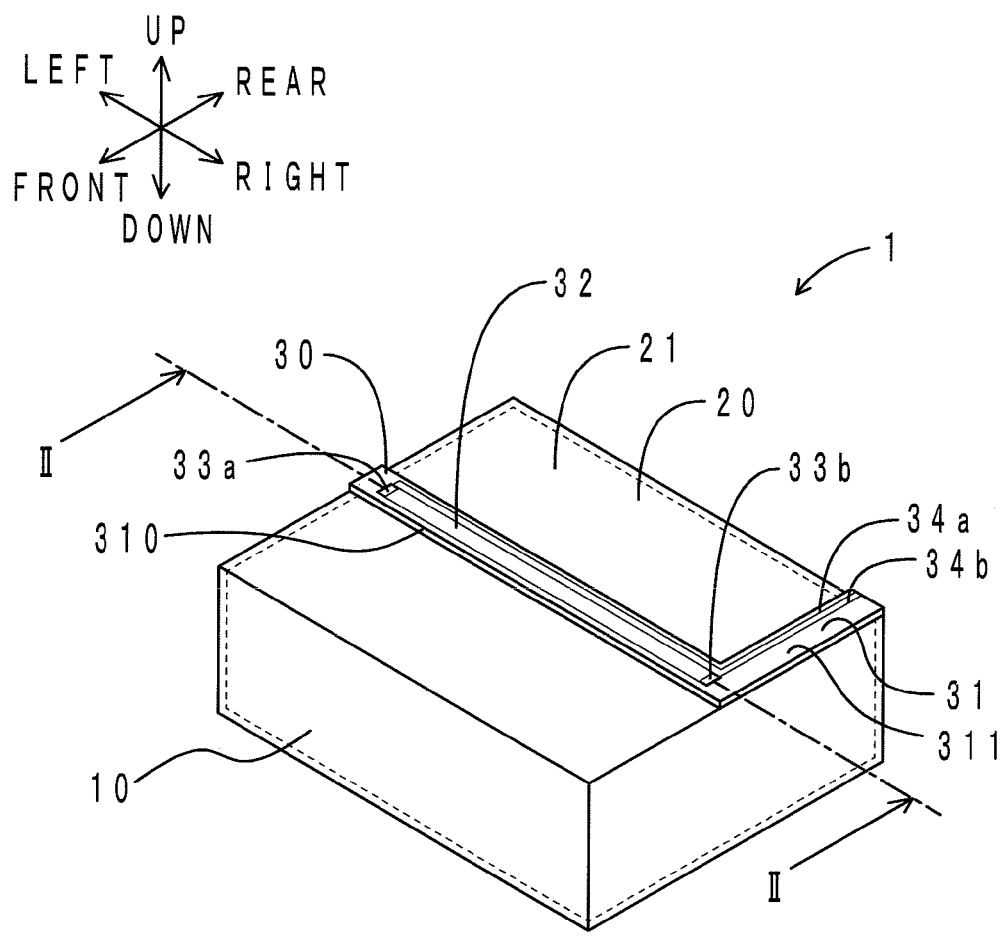
FIG. 1 is a perspective view of an electricity accumulation device according to a first embodiment.
Figure 2:
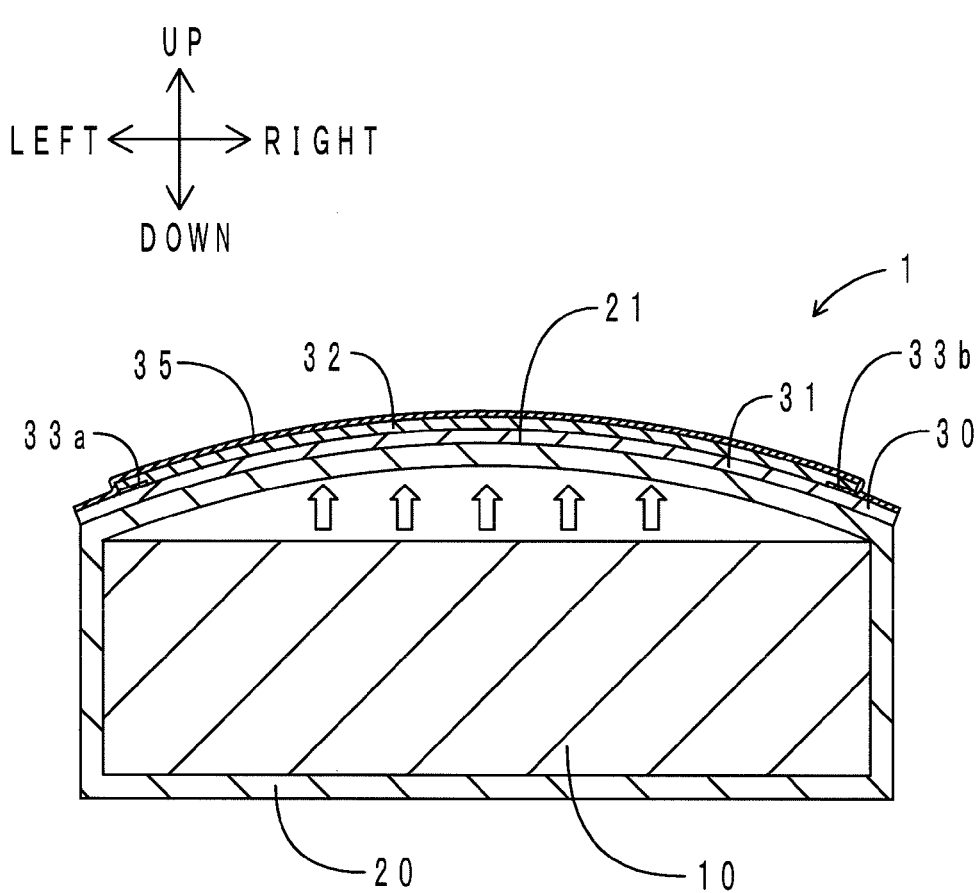
FIG. 2 is a sectional view taken along the line II-II of FIG. 1 at the time of gas generation.

First, the configuration of the electricity accumulation device according to the present embodiment will be described. FIG. 1 is a perspective view of the electricity accumulation device according to the present embodiment. FIG. 2 is a sectional view taken along the line II-II of FIG. 1 at the time of gas generation. In FIG. 1, a cover film disposed on the uppermost surface of a deformation sensor is not shown, and electrodes are shown as transparent. As shown in FIGS. 1 and 2, an electricity accumulation device 1 includes an electricity accumulation element 10, an outer jacket material 20, and a deformation sensor 30.

The electricity accumulation element 10 has a rectangular parallelepiped shape, and includes an electrode laminate (not shown) in which a plurality of cells are laminated. Each of the cells includes a positive electrode and a negative electrode disposed facing each other via a separator, and a current collector. The positive electrode and the negative electrode are impregnated with an electrolyte solution.

The outer jacket material 20 is made of a laminate film. The laminate film includes an aluminum foil and a pair of resin films laminated on both sides of the aluminum film. The outer jacket material 20 coats the outer peripheral surface of the electricity accumulation element 10. An upper surface 21 of the outer jacket material 20 is included in the expansive surface according to the present invention.

The deformation sensor 30 is disposed on the upper surface 21 of the outer jacket material 20. The deformation sensor 30 includes a substrate 31, a sensor membrane 32, a pair of electrodes 33a, 33b, wires 34a, 34b, and a cover film 35.

The substrate 31 is made of polyimide, and has the shape of an L-shaped belt. The substrate 31 includes a sensor portion 310 and a wiring portion 311. The sensor portion 310 is disposed to extend from the left end to the right end of the upper surface 21 of the outer jacket material 20. The sensor portion 310 is disposed so as to cover an area around the center of the upper surface 21.

The sensor membrane 32 has the shape of a belt extending in the left-right direction. The sensor membrane 32 is disposed on the upper surface of the sensor portion 310 of the substrate 31. The sensor membrane 32 is disposed to extend from the left end to the right end of the upper surface 21 of the outer jacket material 20. The sensor membrane 32 is formed by filling EPDM (an ethylene-propylene-diene copolymer) with carbon beads (conductive fillers). The filling rate of the carbon beads is about 45 vol % based on the volume of the sensor membrane 32 being 100 vol %.

Each of the pair of electrodes 33a, 33b has a thin piece shape. Each of the pair of electrodes 33a, 33b is interposed between the substrate 31 and the sensor membrane 32. The electrode 33a is disposed at the left end of the sensor membrane 32. A first end of the wire 34a is connected to the electrode 33a. The electrode 33b is disposed at the right end of the sensor membrane 32. A first end of the wire 34b is connected to the electrode 33b.

The wires 34a, 34b are disposed on the upper surfaces of the sensor portion 310 and the wiring portion 311 of the substrate 31. Each of second ends of the wires 34a, 34b is connected to a control unit (not shown).

The cover film 35 is made of acrylic rubber, and has the shape of an L-shaped belt as with the substrate 31. The cover film 35 covers the substrate 31, the sensor membrane 32, and the wires 34a, 34b from above.

[Operation of Electricity Accumulation Device]

Next, operation of the electricity accumulation device 1 according to the present embodiment will be described. When a gas is generated in the electricity accumulation element 10 as indicated by white arrows in FIG. 2, the upper surface 21 of the outer jacket material 20 is swelled upward. Then, the deformation sensor 30 is also pushed up from below together with the upper surface 21. This causes the sensor membrane 32 to be subjected to bending deformation to be warped upward.

In a natural state before bending deformation shown in FIG. 1, a multiplicity of conductive paths are formed in the sensor membrane 32 through contact between the carbon beads. Thus, the electric resistance of the sensor membrane 32 detected between the electrodes 33a, 33b is relatively low. In a state after bending deformation of the sensor membrane 32 shown in FIG. 2, in contrast, the conductive paths are cut because of a change in state of contact between the carbon beads. This increases the electric resistance of the sensor membrane 32 detected between the electrodes 33a, 33b to be higher than the electric resistance in the natural state before bending deformation. Thus, expansion of the outer jacket material 20 in the electricity accumulation device 1 is sensed on the basis of an increase in output electric resistance.

[Functions and Effects]

Next, functions and effects of the electricity accumulation device 1 according to the present embodiment will be described. In the electricity accumulation device 1 according to the present embodiment, the substrate 31, the sensor membrane 32, and the cover film 35 forming the deformation sensor 30 are all flexible. Therefore, the deformation sensor 30 can be disposed so as to conform to the shape of the upper surface 21 of the outer jacket material 20. This allows expansion of the outer jacket material 20 to be sensed accurately. In addition, displacement of the upper surface 21 of the outer jacket material 20 is directly input to the sensor membrane 32 via the substrate 31. Thus, expansion of the outer jacket material 20 can be sensed easily even in the case where displacement of the upper surface 21 is small, for example in the initial stage of expansion.

In addition, the sensor membrane 32 is disposed to extend from the left end to the right end of the upper surface 21 of the outer jacket material 20. Therefore, expansion of the outer jacket material 20 can be sensed easily without fault. Further, the sensor membrane 32 is disposed so as to cover an area around the center of the upper surface 21. Expansion tends to be caused around the center of the upper surface 21. That is, displacement around the center of the upper surface 21 is larger than displacement around the four sides of the upper surface 21. Therefore, expansion of the outer jacket material 20 can be sensed easily.

In addition, the electricity accumulation device 1 can be manufactured easily by affixing the deformation sensor 30 to the upper surface 21 of the outer jacket material 20. Moreover, the deformation sensor 30 has a sheet shape. Therefore, the electricity accumulation device 1 can be formed compactly. Hence, a plurality of the electricity accumulation devices 1 can be laminated to form a module in a space-saving configuration.

Figure 11:
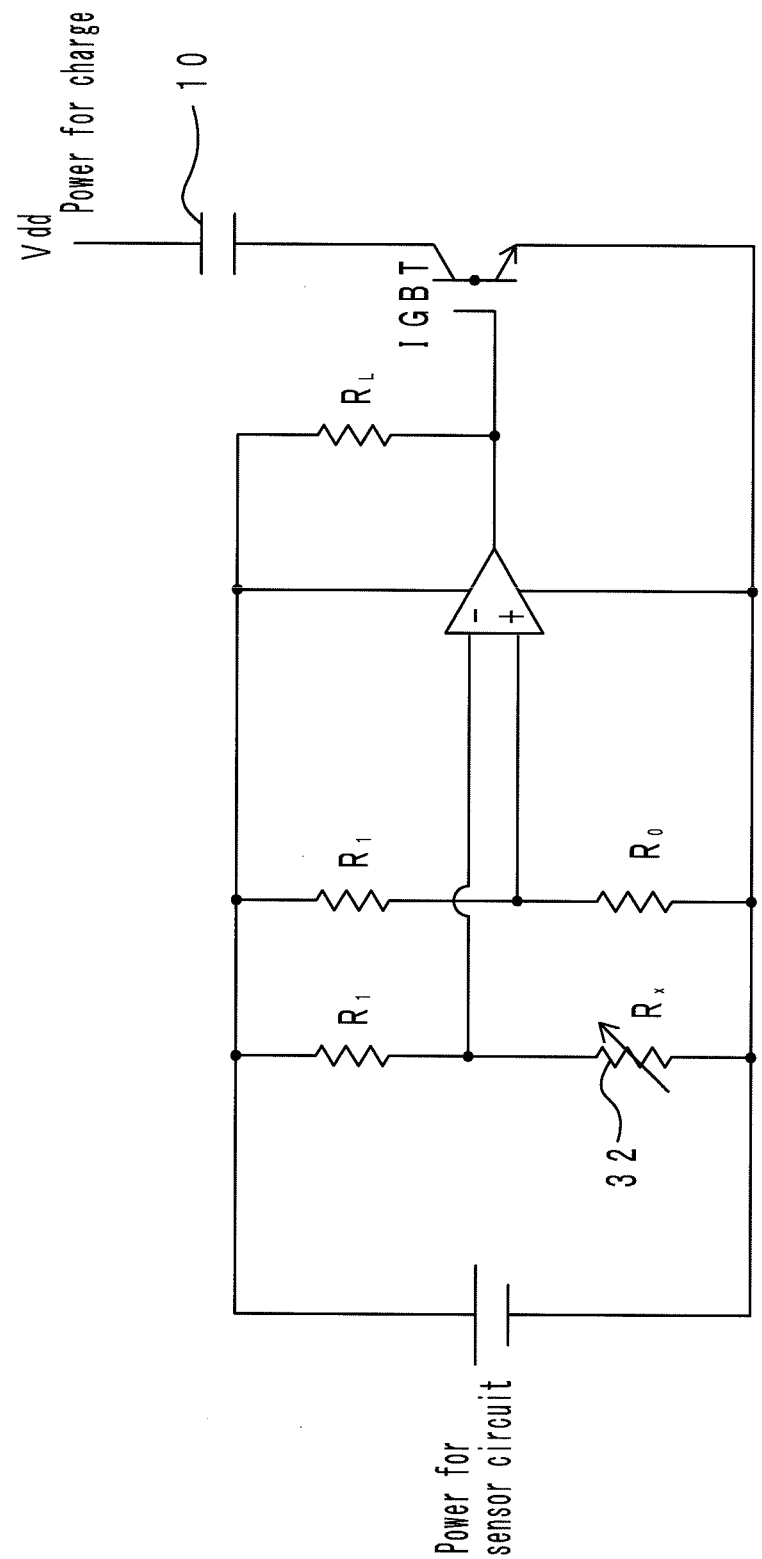
FIG. 11 is a circuit model diagram showing an example of a charge circuit of an electricity accumulation device.
Figure 12A:
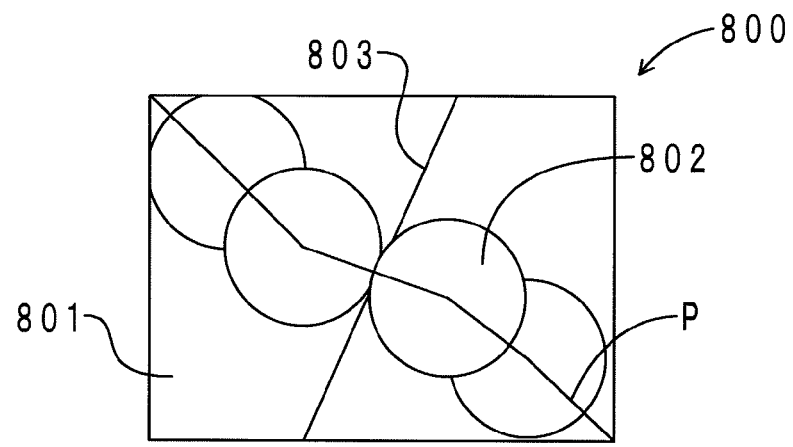
FIG. 12A shows a natural state before bending deformation and FIG. 12B shows a state after bending deformation.
Figure 12B:
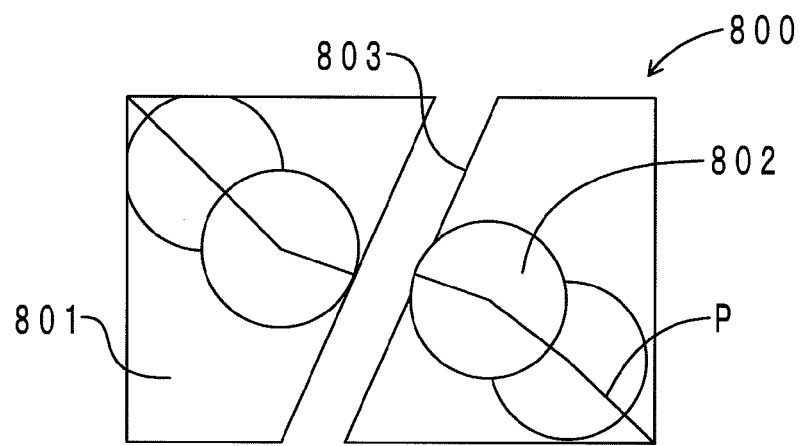

With the electricity accumulation device 1 according to the present embodiment, expansion of the outer jacket material 20 can be sensed on the basis of an increase in electric resistance along with bending deformation of the sensor membrane 32. Thus, the electricity accumulation device 1 provides a high level of safety. In addition, the life of the electricity accumulation device 1 can be enhanced by controlling charge and discharge utilizing the behavior of expansion of the outer jacket material 20. Moreover, it is not necessary to separately provide a protection circuit configured to stop charge in the case where expansion of the outer jacket material 20 exceeds a prescribed value by incorporating a sensor circuit in a charge circuit of the electricity accumulation element 10 as described below. FIG. 11 shows an example of the charge circuit.

As shown in FIG. 11, the electric resistance $R_x$ of the sensor membrane 32 and the reference resistance $R_0$ are compared to control ON/OFF of an IGBT (insulated gate bipolar transistor). Consequently, the IGBT can be turned off to stop charge of the electricity accumulation element 10 in the case where the electric resistance $R_x$ of the sensor membrane 32 becomes higher than the reference resistance $R_0$, that is, in the case where the outer jacket material 20 is expanded significantly, for example.

<Second Embodiment>

The electricity accumulation device according to the present embodiment is different from the electricity accumulation device according to the first embodiment mainly in the configuration of the deformation sensor and in that a deformation input member is provided. Thus, only such differences will be described.

[Configuration of Electricity Accumulation Device]

Figure 3:
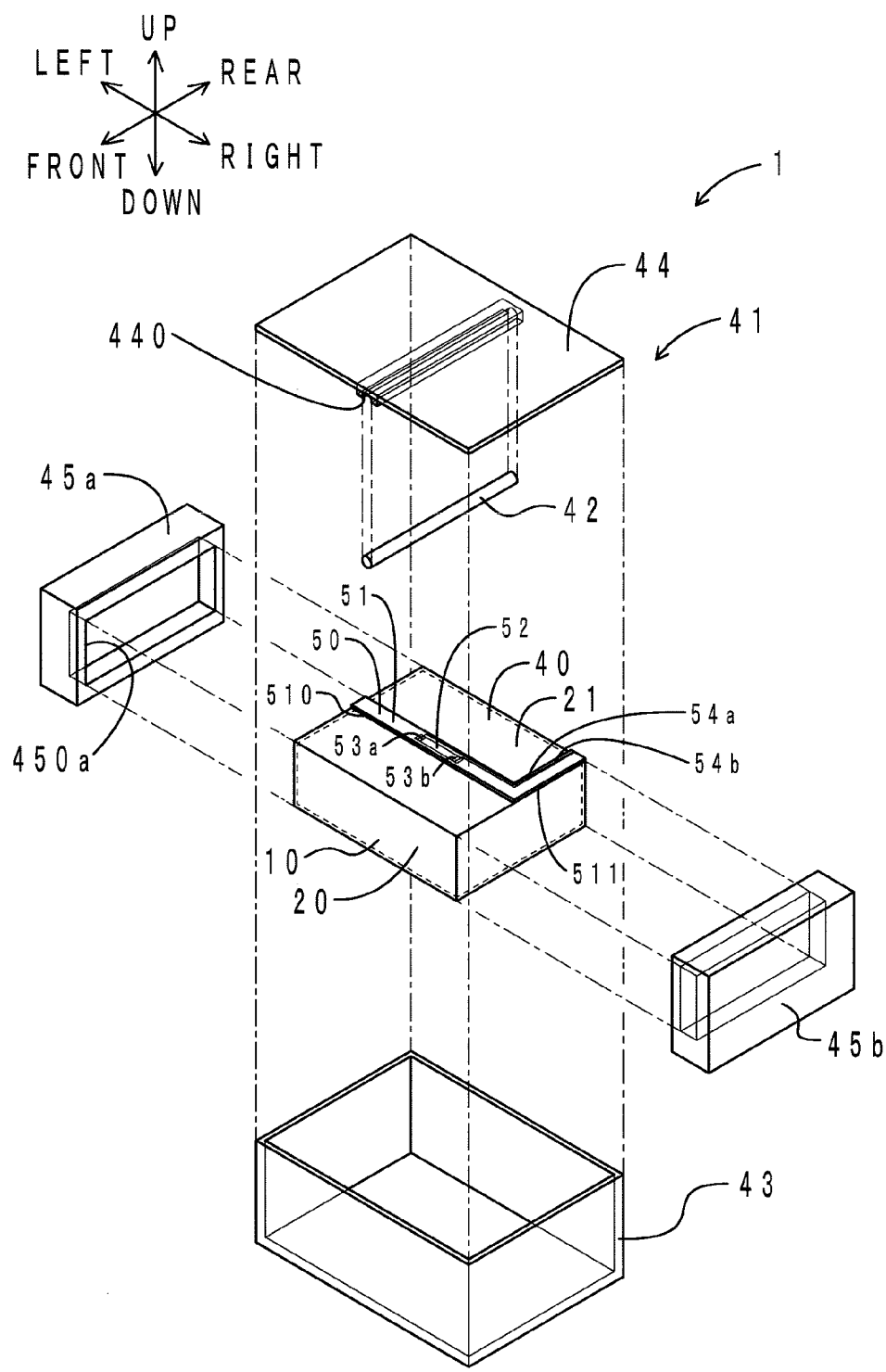
FIG. 3 is an exploded perspective view of an electricity accumulation device according to a second embodiment.
Figure 4:
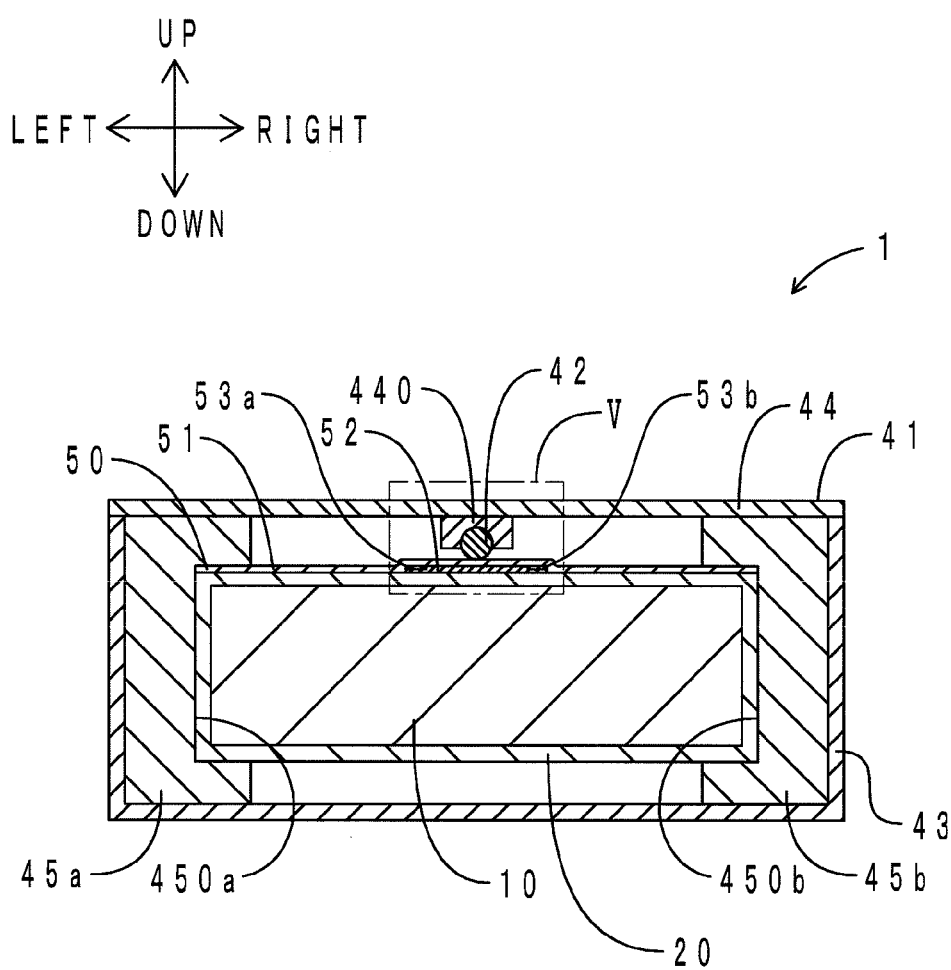
FIG. 4 is a sectional view of the electricity accumulation device.
Figure 5:
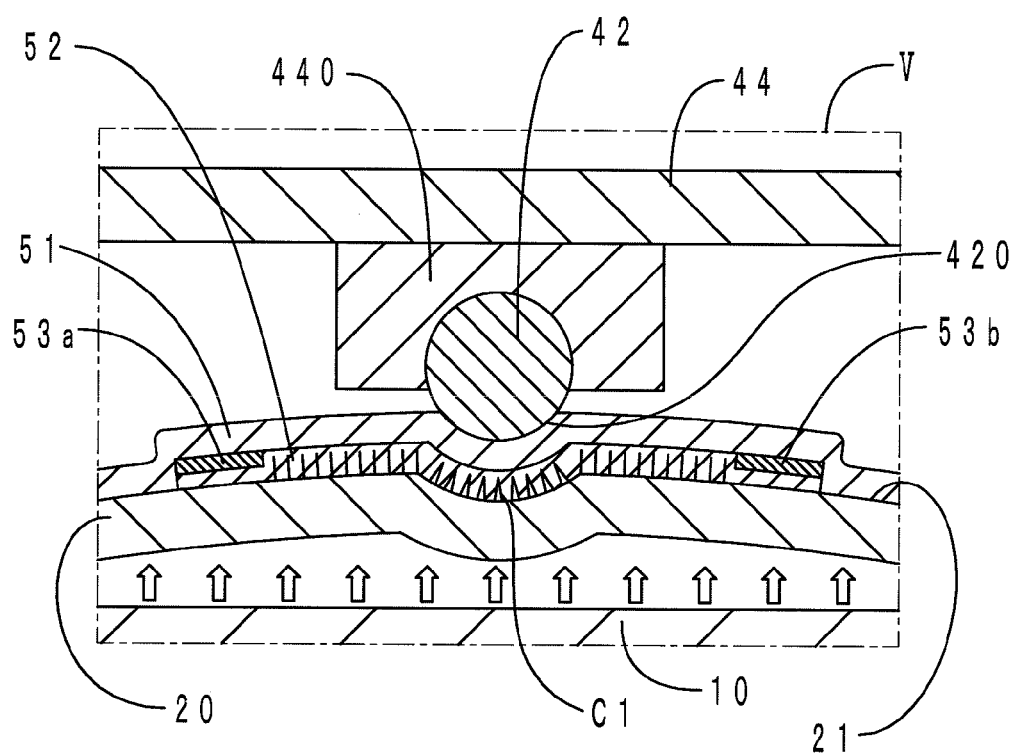
FIG. 5 is an enlarged view inside the region V of FIG. 4.

First, the configuration of the electricity accumulation device according to the present embodiment will be described. FIG. 3 is an exploded perspective view of the electricity accumulation device according to the present embodiment. FIG. 4 is a sectional view of the electricity accumulation device. FIG. 5 is an enlarged view inside the region V of FIG. 4. FIG. 3 corresponds to FIG. 1. Hence, members in FIG. 3 corresponding to those in FIG. 1 are denoted by the same reference symbols. In FIG. 3, the electrodes, the sensor membrane, and the wires of the deformation sensor are shown as transparent. In FIG. 5, for convenience of description, a crack C1 is shown in an exaggerated manner. As shown in FIGS. 3 to 5, the electricity accumulation device 1 includes a device main body 40, a housing 41, and a bar member 42. The device main body 40 includes the electricity accumulation element 10, the outer jacket material 20, and a deformation sensor 50.

The deformation sensor 50 is disposed on the upper surface 21 of the outer jacket material 20. The deformation sensor 50 includes a substrate 51, a sensor membrane 52, a pair of electrodes 53a, 53b, and wires 54a, 54b.

The substrate 51 is made of polyimide, and has the shape of an L-shaped belt. The substrate 51 includes a sensor portion 510 and a wiring portion 511. The sensor portion 510 is disposed to extend from the left end to the right end of the upper surface 21 of the outer jacket material 20. The sensor portion 510 is disposed so as to cover an area around the center of the upper surface 21.

The sensor membrane 52 has the shape of a short strip extending in the left-right direction. The sensor membrane 52 is disposed around the center of the lower surface of the sensor portion 510. That is, the sensor membrane 52 is interposed between the substrate 51 and the upper surface 21 of the outer jacket material 20. The sensor membrane 52 is bonded to the upper surface 21 of the outer jacket material 20.

The sensor membrane 52 is formed by filling an epoxy resin with carbon beads. The filling rate of the carbon beads is about 45 vol % based on the volume of the sensor membrane 52 being 100 vol %. In a natural state before bending deformation, a multiplicity of conductive paths are formed in the sensor membrane 52 through contact between the carbon beads. In addition, as schematically shown in FIG. 5, a plurality of cracks C1 are formed in advance in the sensor membrane 52. The cracks C1 are formed such that the conductive paths are cut when the sensor membrane 52 is subjected to bending deformation. That is, the cracks C1 are formed to extend in the thickness direction (up-down direction) of the sensor membrane 52.

A method of manufacturing the sensor membrane 52 will be described. First, an epoxy resin before being cured, a curing agent, and carbon beads are mixed to prepare a sensor paint. Next, the sensor paint is applied to the surface of the substrate 51. Then, the substrate 51 is curved with the coated membrane of the sensor paint on the inner side, and heated to cure the coated membrane. After that, the substrate 51 is returned from the curved state to the original, flat state. In this event, cracks C1 are formed in the cured coated membrane (sensor membrane).

Each of the pair of electrodes 53a, 53b has a thin piece shape. Each of the pair of electrodes 53a, 53b is interposed between the substrate 51 and the sensor membrane 52. The electrode 53a is disposed at the left end of the sensor membrane 52. A first end of the wire 54a is connected to the electrode 53a. The electrode 53b is disposed at the right end of the sensor membrane 52. A first end of the wire 54b is connected to the electrode 53b.

The wires 54a, 54b are disposed on the lower surfaces of the sensor portion 510 and the wiring portion 511 of the substrate 51. Each of second ends of the wires 54a, 54b is connected to a control unit (not shown).

The housing 41 includes a main body portion 43, a lid portion 44, and a pair of cushioning materials 45a, 45b. The main body portion 43 has a box shape. The main body portion 43 houses the device main body 40 together with the pair of cushioning materials 45a, 45b. The cushioning material 45a is made of thermoplastic rubber, and has a rectangular parallelepiped shape. A support recessed portion 450a is formed in the cushioning material 45a. The left end of the device main body 40 is housed in the support recessed portion 450a. Similarly, the cushioning material 45b is made of thermoplastic rubber, and has a rectangular parallelepiped shape. A support recessed portion 450b is formed in the cushioning material 45b. The right end of the device main body 40 is housed in the support recessed portion 450b. The lid portion 44 is disposed so as to cover the upper opening of the main body portion 43. An attachment portion 440 extending in the front-rear direction is disposed on the lower surface of the lid portion 44.

The bar member 42 has the shape of a circular column extending in the front-rear direction. The bar member 42 is fixed to the attachment portion 440 of the lid portion 44. The bar member 42 includes a curved surface portion 420. The curved surface portion 420 abuts against the upper surface of the substrate 51 of the deformation sensor 50. The bar member 42 is disposed to extend generally orthogonally to a line connecting between the pair of electrodes 53a, 53b of the deformation sensor 50. In other words, the bar member 42 is disposed to extend generally orthogonally to the sensor membrane 52.

[Operation of Electricity Accumulation Device]

Next, operation of the electricity accumulation device 1 according to the present embodiment will be described. When a gas is generated in the electricity accumulation element 10 as shown as enlarged in FIG. 5, the upper surface 21 of the outer jacket material 20 is swelled upward. Then, the deformation sensor 50 is also pushed up from below together with the upper surface 21. In this event, the sensor membrane 52 is pressed by the bar member 42, and subjected to bending deformation to be warped downward along the curved surface portion 420 of the bar member 42.

When the sensor membrane 52 is bent, the cracks C1 in the sensor membrane 52 are opened. Consequently, the conductive paths are cut. In addition, the conductive paths are cut because of a change in state of contact between the carbon beads. As a result, the electric resistance of the sensor membrane 52 detected between the electrodes 53a, 53b becomes higher than the electric resistance in a state before bending deformation. Thus, expansion of the outer jacket material 20 in the electricity accumulation device 1 is sensed on the basis of an increase in output electric resistance.

[Functions and Effects]

Next, functions and effects of the electricity accumulation device 1 according to the present embodiment will be described. The electricity accumulation device 1 according to the present embodiment achieves the same functions and effects as those of the first embodiment for a portion common to the electricity accumulation device 1 according to the first embodiment. In the electricity accumulation device 1 according to the present embodiment, in addition, the sensor membrane 52 is subjected to bending deformation mainly through abutment against the bar member 42. Thus, the amount of bending deformation of the sensor membrane 52 is large compared to a case where the sensor membrane 52 is subjected to bending deformation only through expansion of the outer jacket material 20. This causes a greater increase in electric resistance with respect to displacement of the outer jacket material 20. That is, the sensitivity of the deformation sensor 50 can be enhanced with a relatively simple configuration in which the bar member 42 is provided. Thus, with the electricity accumulation device 1 according to the present embodiment, expansion of the outer jacket material 20 can be sensed even in the case where displacement of the upper surface 21 is small.

In addition, the bar member 42 and the deformation sensor 50 abut against each other in a state before expansion of the outer jacket material 20. This allows bending deformation of the sensor membrane 52 to be started in the initial stage of expansion of the outer jacket material 20. Thus, initial expansion of the outer jacket material 20 can even be sensed. In addition, the bar member 42 is disposed to extend generally orthogonally to the sensor membrane 52. Therefore, the sensor membrane 52 is easily subjected to bending deformation.

In addition, the cracks C1 are formed in the sensor membrane 52. When the sensor membrane 52 is subjected to bending deformation, the cracks C1 are opened. Consequently, the conductive paths are cut, and the electric resistance of the sensor membrane 52 is increased immediately. Thus, a small response delay is caused. In addition, the conductive paths are cut mainly through the opening of the cracks C1. Therefore, even small deformation can be sensed accurately compared to a case where the conductive paths are cut only through elastic deformation of the epoxy resin. Thus, expansion of the outer jacket material 20 can be sensed even in the case where displacement of the upper surface 21 is small.

<Third Embodiment>

The electricity accumulation device according to the present embodiment is different from the electricity accumulation device according to the first embodiment mainly in the configuration and arrangement of the deformation sensor. Thus, only such differences will be described.

[Configuration of Electricity Accumulation Device]

Figure 6:
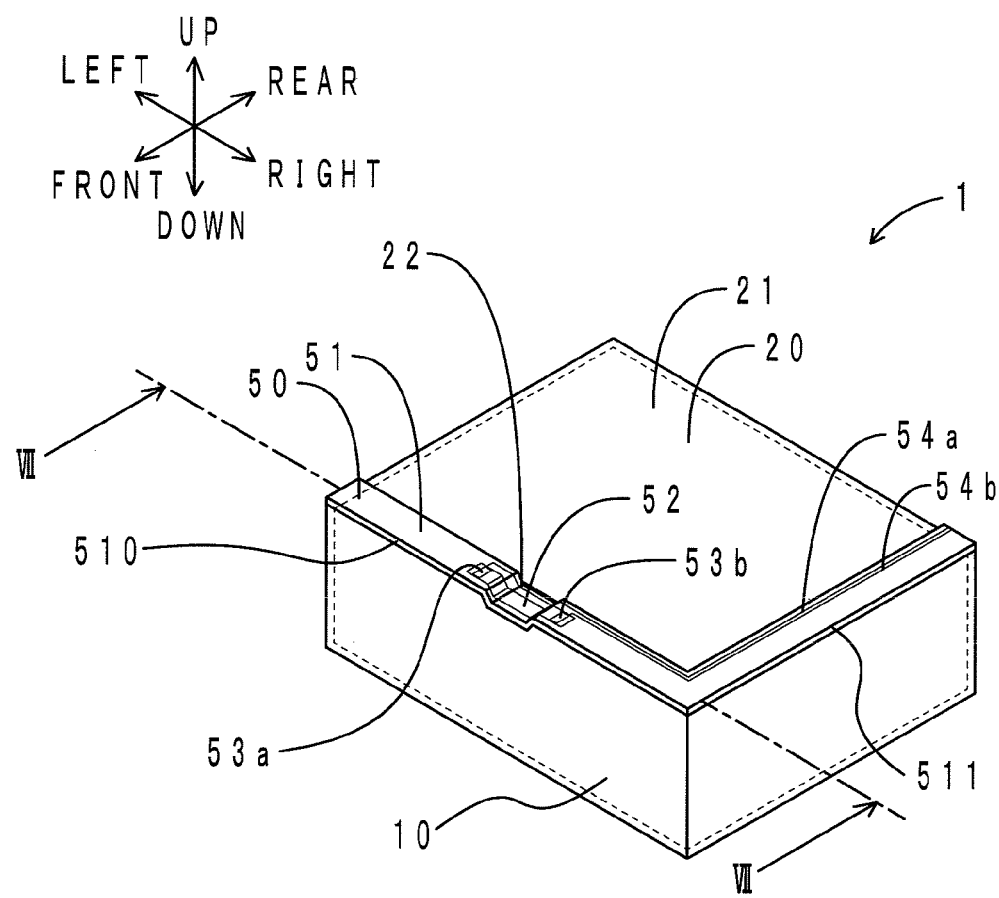
FIG. 6 is a perspective view of an electricity accumulation device according to a third embodiment.
Figure 7:
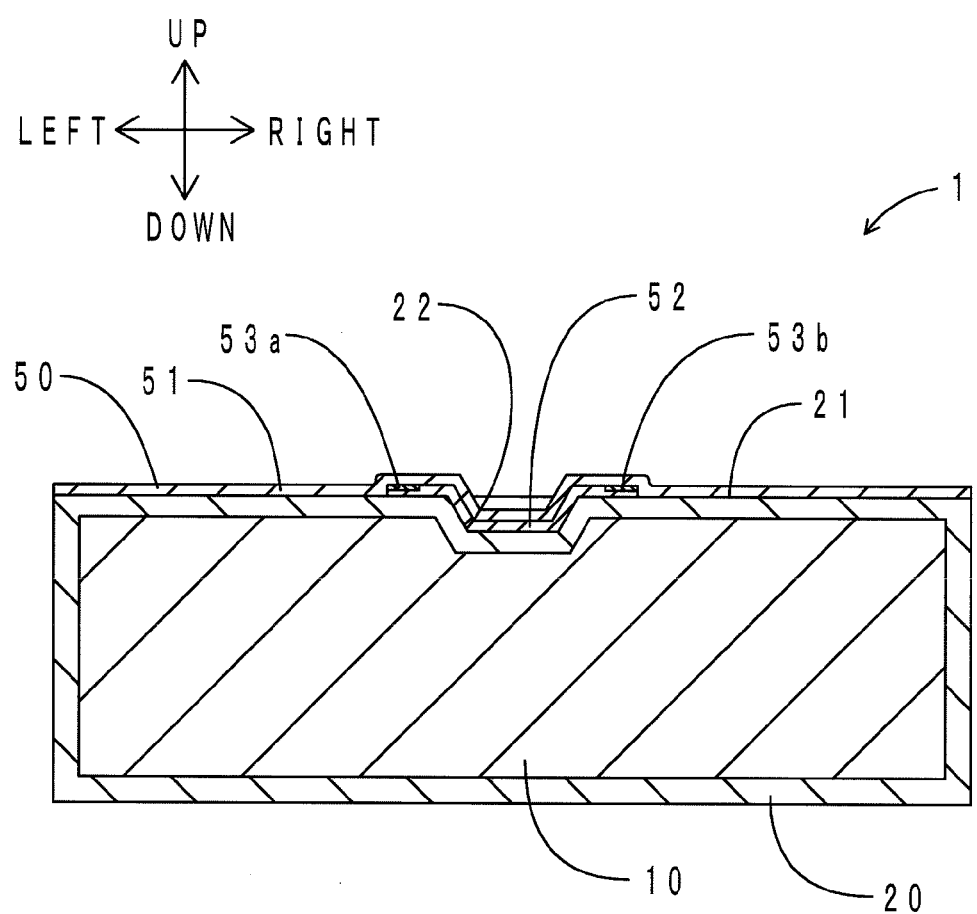
FIG. 7 is a sectional view taken along the line VII-VII of FIG. 6.

First, the configuration of the electricity accumulation device according to the present embodiment will be described. FIG. 6 is a perspective view of the electricity accumulation device according to present the embodiment. FIG. 7 is a sectional view taken along the line VII-VII of FIG. 6. FIG. 6 corresponds to FIG. 1. Hence, members in FIG. 6 corresponding to those in FIG. 1 are denoted by the same reference symbols. In FIG. 6, the electrodes, the sensor membrane, and the wires of the deformation sensor are shown as transparent. As shown in FIGS. 6 and 7, the electricity accumulation device 1 includes the electricity accumulation element 10, the outer jacket material 20, and the deformation sensor 50.

A recessed portion 22 is formed around the center of the front end portion of the upper surface 21 of the outer jacket material 20. The recessed portion 22 has a trapezoidal shape in section. The deformation sensor 50 includes the substrate 51, the sensor membrane 52, the pair of electrodes 53a, 53b, and the wires 54a, 54b. The configuration of the deformation sensor 50 is the same as that in the second embodiment described above. Hence, description thereof is omitted.

The wiring portion 511 of the substrate 51 of the deformation sensor 50 is disposed along the right end of the upper surface 21 of the outer jacket material 20. Meanwhile, the sensor portion 510 of the substrate 51 is disposed along the front end of the upper surface 21. A portion of the sensor portion 510 around its center is disposed while being bent so as to conform to the shape of the recessed portion 22. The sensor membrane 52 is disposed around the center of the lower surface of the sensor portion 510. The sensor membrane 52 is disposed while being subjected to bending deformation so as to conform to the shape of the recessed portion 22.

A method of arranging the deformation sensor 50 will be described. First, a notched portion having generally the same shape as the shape of the recessed portion 22 is formed around the center of the front end of the upper surface of the electricity accumulation element 10. Next, the electricity accumulation element 10 is coated by the outer jacket material 20. After that, the deformation sensor 50 is bonded along the front end and the right end of the upper surface of the outer jacket material 20. Subsequently, air inside the outer jacket material 20 is removed by vacuuming. Then, the outer jacket material 20 closely adheres to the outer peripheral surface of the electricity accumulation element 10. As a result, the recessed portion 22 is formed in the upper surface 21 of the outer jacket material 20 along the notched portion of the electricity accumulation element 10. At the same time, a portion of the sensor portion 510 around its center is also deformed so as to conform to the shape of the recessed portion 22 together with the outer jacket material 20. In this event, tensile warping is input to the sensor membrane 52. Then, the sensor membrane 52 is disposed while being subjected to bending deformation so as to conform to the shape of the recessed portion 22.

[Operation of Electricity Accumulation Device]

Next, operation of the electricity accumulation device 1 according to the present embodiment will be described. When a gas is generated in the electricity accumulation element 10, the upper surface 21 of the outer jacket material 20 is swelled upward. In this event, the bottom surface of the recessed portion 22 is also swelled upward. This causes the deformation sensor 50 to be pushed up from below together with the recessed portion 22 to be brought closer to a flat state (natural state). That is, the sensor membrane 52 is urged to return to its natural state before being subjected to bending deformation.

With the sensor membrane 52 in the bending deformation state before gas generation, some of the conductive paths are cut because of opening of the cracks C1 and variations in state of contact between the carbon beads. Thus, the electric resistance of the sensor membrane 52 detected between the electrodes 53a, 53b is relatively high. In the course of the sensor membrane 52 restoring its natural state after gas generation, in contrast, the cracks C1 are closed and the state of contact between the carbon beads is recovered to form conductive paths. This reduces the electric resistance of the sensor membrane 52 detected between the electrodes 53a, 53b to be lower than the electric resistance in the bending deformation state. Thus, the initial stage of expansion of the outer jacket material 20 in the electricity accumulation device 1 is sensed on the basis of a decrease in output electric resistance.

[Functions and Effects]

Next, functions and effects of the electricity accumulation device 1 according to the present embodiment will be described. The electricity accumulation device 1 according to the present embodiment achieves the same functions and effects as those of the first and second embodiments for a portion common to the electricity accumulation devices 1 according to the first and second embodiments. With the electricity accumulation device 1 according to the present embodiment, in addition, the initial stage of expansion of the outer jacket material 20 can be sensed on the basis of a decrease in electric resistance caused in the course of the sensor membrane 52 restoring its natural state from the bending deformation state. Hence, the electricity accumulation device 1 according to the present embodiment is suitable to sense the behavior at the start of gas generation. In addition, expansion of the outer jacket material 20 can be sensed conveniently and at a low cost utilizing the recessed portion 22 in the upper surface 21 of the outer jacket material 20. Moreover, the sensor membrane 52 is disposed in the recessed portion 22, and therefore the electricity accumulation device 1 can be formed compactly. Hence, a plurality of the electricity accumulation devices 1 can be stacked to form a module in a space-saving configuration.

<Fourth Embodiment>

The electricity accumulation device according to the present embodiment is different from the electricity accumulation device according to the first embodiment mainly in the configuration and arrangement of the deformation sensor. Thus, only such differences will be described.

[Configuration of Electricity Accumulation Device]

Figure 8:
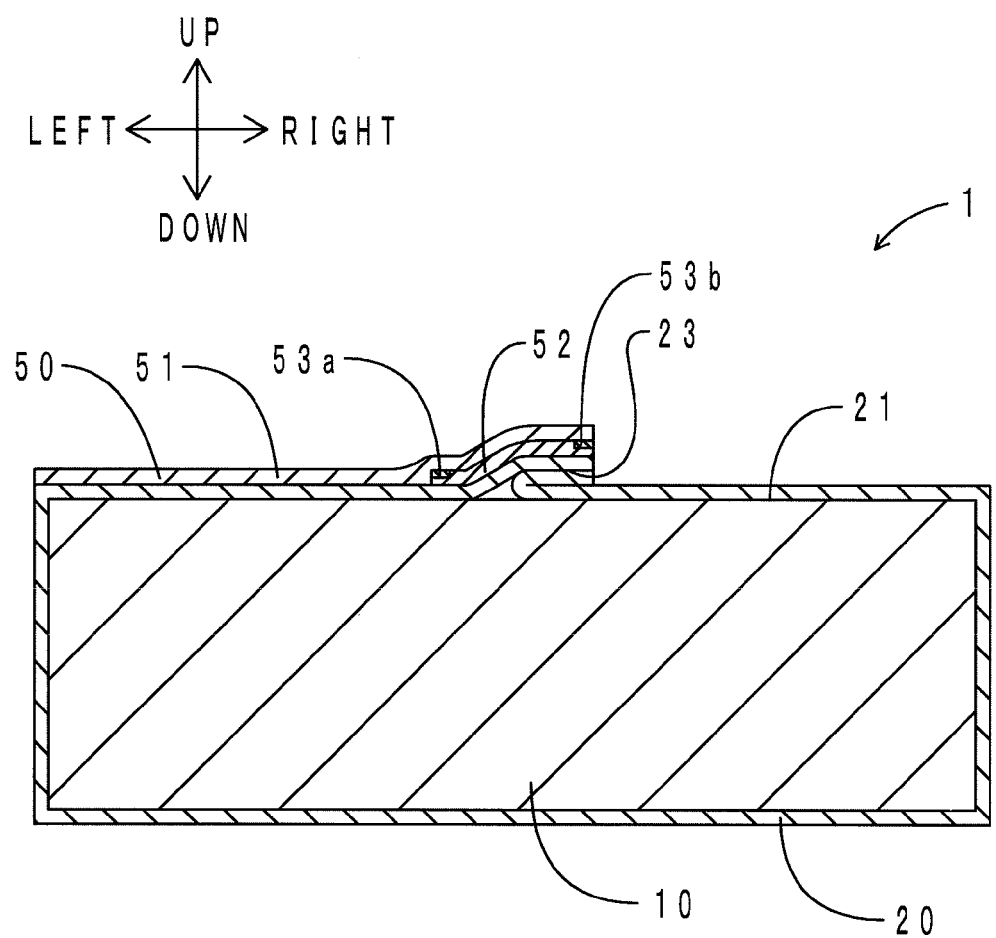
FIG. 8 is a sectional view of an electricity accumulation device according to a fourth embodiment.
Figure 9:
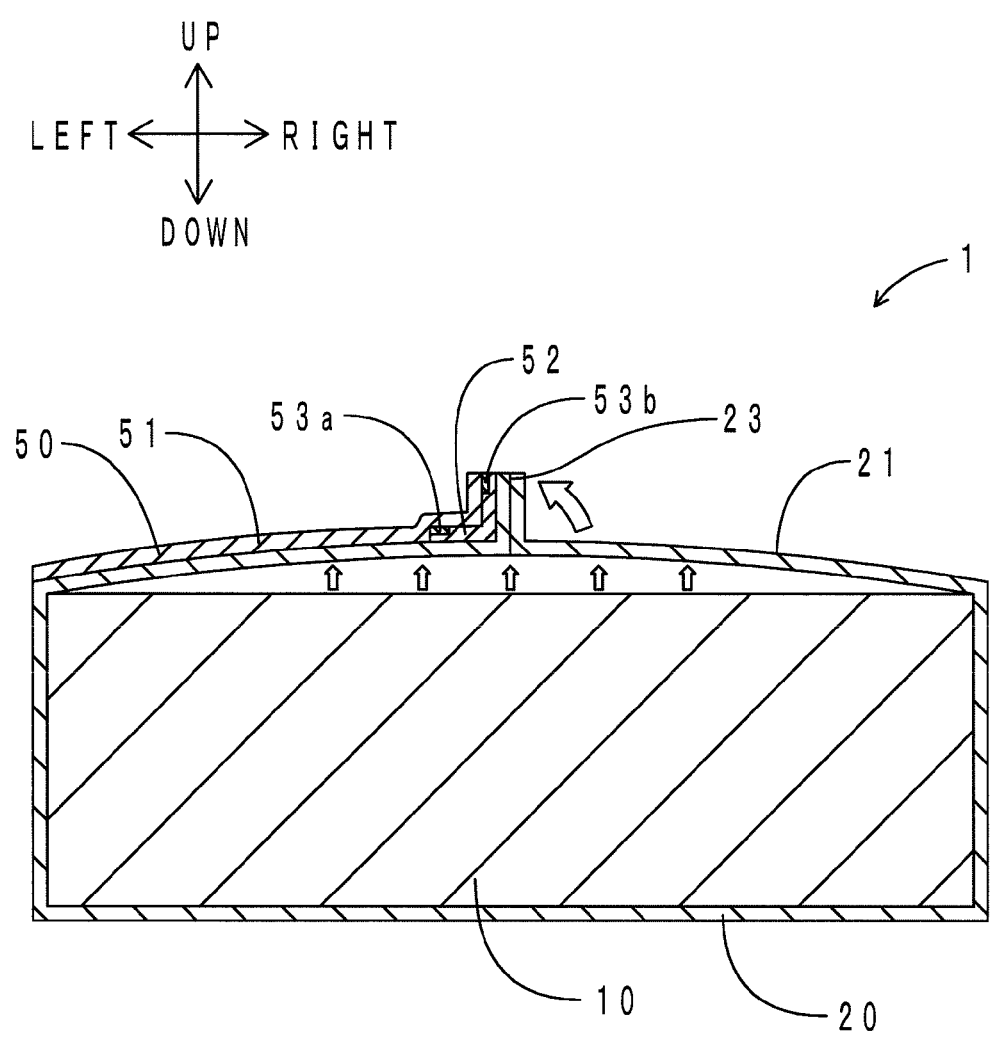
FIG. 9 is a sectional view of the electricity accumulation device at the time of gas generation.

First, the configuration of the electricity accumulation device according to the present embodiment will be described. FIG. 8 is a sectional view of the electricity accumulation device according to the present embodiment. FIG. 9 is a sectional view of the electricity accumulation device at the time of gas generation. As shown in FIGS. 8 and 9, the electricity accumulation device 1 includes the electricity accumulation element 10, the outer jacket material 20, and the deformation sensor 50.

The outer jacket material 20 is made of a laminate film. A seal portion 23 extending in the front-rear direction is disposed on the upper surface 21 of the outer jacket material 20. The seal portion 23 is formed by heat-sealing one end and the other end of the outer jacket material 20 that overlap each other on the upper surface of the electricity accumulation element 10. The seal portion 23 is disposed to be folded rightward. The seal portion 23 and the upper surface 21 of the outer jacket material 20 are not fixed to each other.

The deformation sensor 50 includes the substrate 51, the sensor membrane 52, the pair of electrodes 53a, 53b, and the wires (not shown). The substrate 51 is made of polyimide, and has a belt shape. The substrate 51 is disposed to extend from the left end of the upper surface 21 of the outer jacket material 20 so as to overlap the seal portion 23.

The sensor membrane 52 has the shape of a short strip extending in the left-right direction. The sensor membrane 52 is disposed to extend from an area around the center of the upper surface 21 of the outer jacket material 20 so as to overlap the seal portion 23. The sensor membrane 52 is interposed between the substrate 51 and the outer jacket material 20. The configuration of the deformation sensor 52 and the method of manufacturing the deformation sensor 52 are the same as those in the second embodiment described above. Hence, description thereof is omitted.

Each of the pair of electrodes 53a, 53b has a thin piece shape. Each of the pair of electrodes 53a, 53b is interposed between the substrate 51 and the sensor membrane 52. The electrode 53a is disposed at the left end of the sensor membrane 52. The electrode 53b is disposed at the right end of the sensor membrane 52. Respective one ends of the wires are connected to the electrodes 53a, 53b.

[Operation of Electricity Accumulation Device]

Next, operation of the electricity accumulation device 1 according to the embodiment will be described. When a gas is generated in the electricity accumulation element 10 as indicated by white arrows in FIG. 9, the upper surface 21 of the outer jacket material 20 is swelled upward. Then, the seal portion 23 which has been folded stands upright. When the seal portion 23 stands upright, a portion of the deformation sensor 50 that overlaps the seal portion 23 stands upright. That is, the sensor membrane 52 is subjected to bending deformation.

When the sensor membrane 52 is bent, the cracks C1 in the sensor membrane 52 are opened. Consequently, the conductive paths are cut. In addition, the conductive paths are cut because of a change in state of contact between the carbon beads. As a result, the electric resistance of the sensor membrane 52 detected between the electrodes 53a, 53b becomes higher than the electric resistance in a state before bending deformation. Thus, expansion of the outer jacket material 20 in the electricity accumulation device 1 is sensed on the basis of an increase in output electric resistance.

[Functions and Effects]

Next, functions and effects of the electricity accumulation device 1 according to the present embodiment will be described. The electricity accumulation device 1 according to the present embodiment achieves the same functions and effects as those of the first and second embodiments for a portion common to the electricity accumulation devices 1 according to the first and second embodiments. In the electricity accumulation device 1 according to the present embodiment, in addition, the deformation sensor 50 may be disposed such that a part of the sensor membrane 52 overlaps the seal portion 23. This facilitates manufacture of the electricity accumulation device 1. Thus, with the electricity accumulation device 1 according to the present embodiment, expansion of the outer jacket material 20 can be sensed conveniently and at a low cost utilizing the seal portion 23 of the outer jacket material 20. In addition, the deformation sensor 50 is disposed on the upper surface 21 of the outer jacket material 20 and the seal portion 23. Therefore, the electricity accumulation device 1 can be formed compactly. Hence, a plurality of the electricity accumulation devices 1 can be laminated to form a module in a space-saving configuration.

<Fifth Embodiment>

The electricity accumulation device according to the embodiment is different from the electricity accumulation device according to the second embodiment mainly in the arrangement of the deformation sensor and in that a deformation input member is not provided. Thus, only such differences will be described.

[Configuration of Electricity Accumulation Device]

Figure 10:
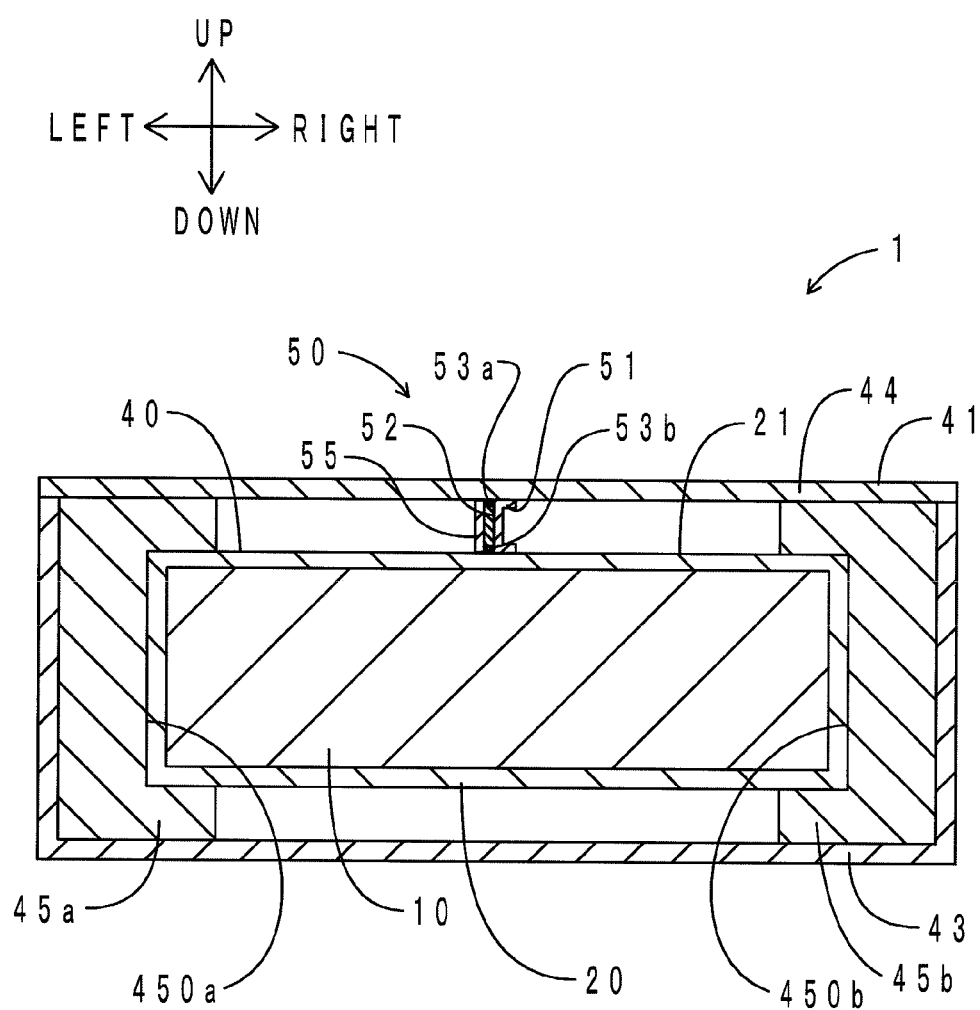
FIG. 10 is a sectional view of an electricity accumulation device according to a fifth embodiment.

First, the configuration of the electricity accumulation device according to the embodiment will be described. FIG. 10 is a sectional view of the electricity accumulation device according to the embodiment. FIG. 10 corresponds to FIG. 4. Hence, members in FIG. 10 corresponding to those in FIG. 4 are denoted by the same reference symbols. As shown in FIG. 10, the electricity accumulation device 1 includes the device main body 40 and the housing 41. The device main body 40 includes the electricity accumulation element 10, the outer jacket material 20, and the deformation sensor 50.

The deformation sensor 50 is interposed between the outer jacket material 20 and the lid portion 44 of the housing 41. The deformation sensor 50 includes the substrate 51, the sensor membrane 52, the pair of electrodes 53a, 53b, the wires (not shown), and a cover film 55.

The substrate 51 is made of polyimide, and has the shape of a short strip that is C-shaped in section. The upper end of the substrate 51 is fixed to the lid portion 44 of the housing 41. In addition, the lower end of the substrate 51 is fixed to the upper surface 21 of the outer jacket material 20.

The sensor membrane 52 has the shape of a short strip extending in the up-down direction. The sensor membrane 52 is disposed on the left surface of the substrate 51. The configuration of the sensor membrane 52 and the method of manufacturing the sensor membrane 52 are the same as those in the second embodiment described above. Hence, description thereof is omitted.

Each of the pair of electrodes 53a, 53b has a thin piece shape. Each of the pair of electrodes 53a, 53b is interposed between the substrate 51 and the sensor membrane 52. The electrode 53a is disposed at the upper end of the sensor membrane 52. The electrode 53b is disposed at the lower end of the sensor membrane 52. Respective one ends of the wires are connected to the electrodes 53a, 53b.

The cover film 55 is made of acrylic rubber, and has the shape of a short strip extending in the up-down direction. The cover film 55 coats the sensor membrane 52 from the left.

[Operation of Electricity Accumulation Device]

Next, operation of the electricity accumulation device 1 according to the embodiment will be described. When a gas is generated in the electricity accumulation element 10, the upper surface 21 of the outer jacket material 20 is swelled upward. This makes the distance between the upper surface 21 and the lid portion 44 of the housing 41 shorter. The lower end of the deformation sensor 50 is fixed to the upper surface 21, and therefore the sensor membrane 52 is subjected to bending deformation to be warped leftward as the upper surface 21 is swelled.

When the sensor membrane 52 is bent, the cracks C1 in the sensor membrane 52 are opened. Consequently, the conductive paths are cut. In addition, the conductive paths are cut because of a change in state of contact between the carbon beads. As a result, the electric resistance of the sensor membrane 52 detected between the electrodes 53a, 53b becomes higher than the electric resistance in a state before bending deformation. Thus, expansion of the outer jacket material 20 in the electricity accumulation device 1 is sensed on the basis of an increase in output electric resistance.

[Functions and Effects]

Next, functions and effects of the electricity accumulation device 1 according to the present embodiment will be described. The electricity accumulation device 1 according to the present embodiment achieves the same functions and effects as those of the first and second embodiments for a portion common to the electricity accumulation devices 1 according to the first and second embodiments. With the electricity accumulation device 1 according to the present embodiment, in addition, expansion of the outer jacket material 20 can be sensed conveniently and at a low cost utilizing the housing 41.

<Other Embodiments>

Electricity accumulation devices according to embodiments of the present invention have been described above. However, electricity accumulation device according to embodiments of the present invention are not limited to those described above. The present invention can also be implemented in a variety of modified or improved forms that may occur to those skilled in the art.

For example, the shape and the configuration of the deformation sensor are not limited to those in the embodiments described above. In the first embodiment, EPDM is used for the base material of the sensor membrane. However, the type of the elastomer for the base material is not specifically limited. Examples of the base material include natural rubber, isoprene rubber, butadiene rubber, acrylonitrile-butadiene copolymer rubber, styrene-butadiene copolymer rubber, butyl rubber, halogenated butyl rubber, hydrogenated nitrile rubber, chloroprene rubber, acrylic rubber, chlorosulfonated polyethylene rubber, hydrin rubber, silicone rubber, fluoro rubber, and urethane rubber.

In the second to fifth embodiments, an epoxy resin is used for the base material of the sensor membrane. However, the type of the resin for the base material is not specifically limited. Examples of thermosetting resins include an alkyd resin, a phenol resin, a urea resin, a melamine resin, an unsaturated polyester resin, polyurethane, and polyimide. Examples of thermoplastic resins include polyethylene, polypropylene, polyvinyl chloride, polystyrene, polyvinyl acetate, polytetrafluoroethylene, an acrylonitrile-butadiene-styrene resin, an acrylic resin, polyamide, polyacetal, polycarbonate, polyphenylene oxide, polyethylene terephthalate, and polybutylene terephthalate.

The conductive fillers with which the base material is filled may be any conductive particles. Examples of the conductive fillers include minute particles of a carbon material, a metal, and so forth. Among these, one kind may be used singly, or two or more kinds may be used in combination. From the viewpoint of filling the base material with the conductive fillers in the closest packed state in order to form conductive paths, spherical particles are preferably adopted as the conductive fillers. The number, shape, and arrangement of the electrodes may be set as appropriate.

In the second to fifth embodiments, cracks are formed in the sensor membrane. The method of forming the cracks is not limited to those in the embodiments described above. For example, a sensor paint may be printed on the surface of the substrate with recesses and projections to be cured. Thus, cracks can be formed because of concentration of a stress at corner portions of the recesses and projections when the coated membrane is cured. Further, by bending the sensor membrane after the curing, the number of cracks can be increased, and the cracks can be dispersed in the resin.

In the first and fifth embodiments, a cover film is disposed so as to cover the surface of the sensor membrane. However, the cover film is not necessarily required.

In the first embodiment, the deformation sensor is disposed to extend from the left end to the right end of the upper surface (expansive surface) of the outer jacket material. However, the location at which the deformation sensor is disposed is not specifically limited. For example, the deformation sensor may be disposed such that the sensor membrane covers the entire expansive surface.

In the second embodiment, a bar member having a circular column shape is used as the deformation input member. However, the shape, arrangement, etc. of the deformation input member are not specifically limited. The deformation input member may be fixed to the housing, or may be directly disposed on the expansive surface of the outer jacket material. For example, the device main body (electricity accumulation element+outer jacket material+deformation sensor) may be bound with a string member, and the string member may be used as the deformation input member. In the second embodiment, in addition, the deformation input member is disposed generally orthogonally to the sensor membrane. However, the direction of arrangement of the deformation input member with respect to the sensor membrane is not specifically limited. The deformation input member may be disposed so as to intersect the sensor membrane. For example, the deformation input member may be disposed obliquely with respect to the sensor membrane. From the viewpoint of subjecting the sensor membrane to bending deformation, it is desirable that the deformation input member should have a curved surface portion that abuts against the deformation sensor.

In the third embodiment, the sensor membrane is disposed in the recessed portion in the expansive surface of the outer jacket material. In this case, the shape, number, location, etc. of the recessed portion are not specifically limited. In the third embodiment, in addition, the sensor membrane is disposed on the lower surface of the substrate. That is, the sensor membrane is disposed with some of the cracks opened because of bending deformation. However, it is not specifically limited whether or not the cracks are opened with the sensor membrane in the initial state. For example, the deformation sensor according to the third embodiment described above may be disposed oppositely in the up-down direction (with the sensor membrane disposed on the upper surface of the substrate).

In the embodiments described above, a laminate film is used as the outer jacket material. However, the material of the outer jacket material is not specifically limited. For example, the outer jacket material may be a case made of a metal. In the embodiments described above, in addition, the sensor membrane is formed in the shape of a belt or a short strip connecting between the pair of electrodes. However, the shape of the sensor membrane is not specifically limited. The shape of the sensor membrane may be set as appropriate such that the initial resistance value of the sensor membrane is a desired set value. For example, the sensor membrane may be shaped as a desired straight or curved line connecting between the pair of electrodes.

EXAMPLES

Next, the present invention will be described specifically by way of examples.

<First Response Experiment>

Figure 13:
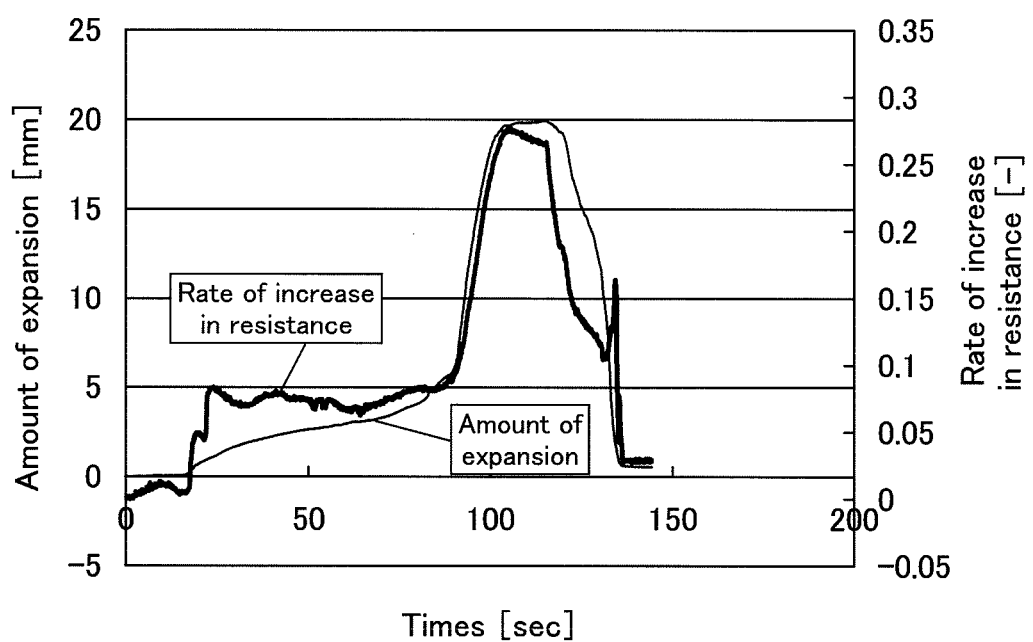
FIG. 13 is a graph showing variations over time in electric resistance of a deformation sensor and amount of expansion of an outer jacket material.

An electricity accumulation device model having the same configuration as the first embodiment described above was fabricated, and the outer jacket material was expanded to evaluate the responsiveness of the deformation sensor with respect to the amount of expansion of the outer jacket material. The electricity accumulation device model was sized to have a longitudinal length (length in the left-right direction) of 260 mm, a lateral length (length in the front-rear direction) of 230 mm, and a thickness (length in the up-down direction) of 48 mm. The sensor membrane was sized to have a longitudinal length of 260 mm and a lateral length of 5 mm. FIG. 13 shows variations over time in electric resistance of the deformation sensor and amount of expansion of the outer jacket material. In FIG. 13, the rate of increase in electric resistance of the deformation sensor is indicated by the thick line, and the amount of expansion of the outer jacket material is indicated by the thin line. The rate of increase in resistance represented by the vertical axis of FIG. 13 is calculated by the following equation (1). The amount of expansion was obtained by measuring displacement of an area around the center of the electricity accumulation device model in the thickness direction using a laser displacement meter.

$$\text{Rate of increase in resistance } (-) = \Delta R/R_0 = (R-R_0)/R_0 \quad (1)$$

[$R_0$: initial electric resistance value before expansion of the outer jacket material, R: electric resistance value measured after expansion of the outer jacket material]

As shown in FIG. 13, the electric resistance of the deformation sensor was increased as the amount of expansion of the outer jacket material was increased. Variations in electric resistance of the deformation sensor generally coincided with the behavior of expansion and contraction of the outer jacket material.

<Second Response Experiment>

Figure 14:
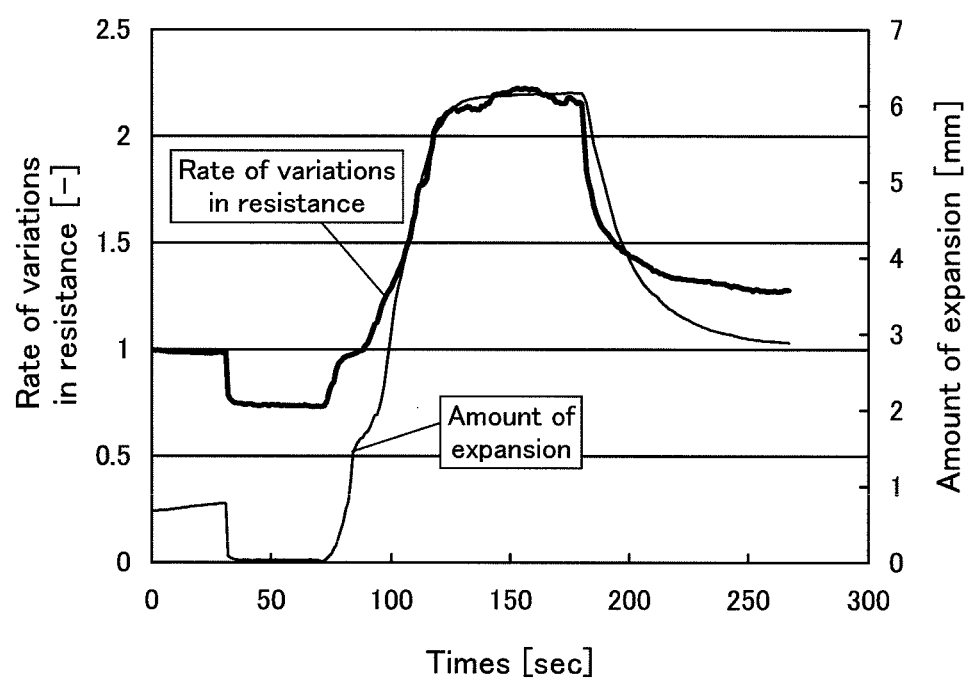
FIG. 14 is a graph showing variations over time in electric resistance of a deformation sensor and amount of expansion of an outer jacket material.

An electricity accumulation device model having the same configuration as the second embodiment described above except that no housing was provided was fabricated, and the outer jacket material was expanded to evaluate the responsiveness of the deformation sensor with respect to the amount of expansion of the outer jacket material. The bar member was supported by a separate support member to abut against the deformation sensor. The bar member had a diameter of 9 mm. The size of the device main body was the same as that of the model for First Response Experiment. The sensor membrane was sized to have a longitudinal length of 30 mm and a lateral length of 5 mm. The amount of expansion of the outer jacket material was obtained by measuring displacement of a portion of the device main body on the left side of the bar member in the thickness direction using a laser displacement meter. FIG. 14 shows variations over time in electric resistance of the deformation sensor and amount of expansion of the outer jacket material. In FIG. 14, the rate of variations in electric resistance of the deformation sensor is indicated by the thick line, and the amount of expansion of the outer jacket material is indicated by the thin line. The rate of variations in resistance represented by the vertical axis of FIG. 14 is calculated by the following equation (2).

$$\text{Rate of variations in resistance } (-) = R/R_0 \quad (2)$$

As shown in FIG. 14, the electric resistance of the deformation sensor was increased as the amount of expansion of the outer jacket material was increased. Variations in electric resistance of the deformation sensor generally coincided with the behavior of expansion and contraction of the outer jacket material.

<Third Response Experiment>

Figure 15:
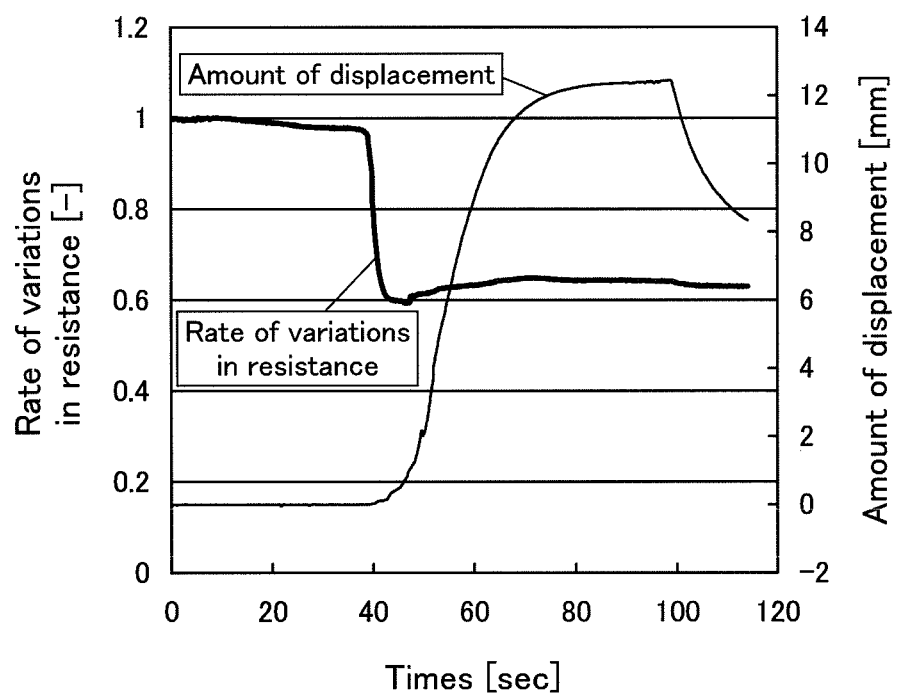
FIG. 15 is a graph showing variations over time in electric resistance of a deformation sensor and amount of displacement of the bottom surface of a recessed portion.

An electricity accumulation device model having the same configuration as the third embodiment described above was fabricated, and the outer jacket material was expanded to evaluate the responsiveness of the deformation sensor with respect to the amount of displacement of the bottom surface of the recessed portion. The size of the electricity accumulation device model was the same as that of the model for First Response Experiment. The recessed portion was sized such that the trapezoidal sectional shape of the recessed portion had an upper base length of 40 mm, a lower base length of 20 mm, and a height of 5 mm. The sensor membrane before being disposed in the recessed portion was sized to have a longitudinal length of 60 mm and a lateral length of 5 mm. The amount of displacement of the bottom surface of the recessed portion was obtained by measuring displacement of the bottom surface of the recessed portion in the up-down direction using a laser displacement meter. FIG. 15 shows variations over time in electric resistance of the deformation sensor and amount of displacement of the bottom surface of the recessed portion. In FIG. 15, the rate of variations in resistance of the deformation sensor is indicated by the thick line, and the amount of displacement of the bottom surface of the recessed portion is indicated by the thin line. The rate of variations in resistance represented by the vertical axis of FIG. 15 is calculated using the equation (2) given above.

As shown in FIG. 15, the electric resistance of the deformation sensor was abruptly decreased when the bottom surface of the recessed portion started displacing upward along with expansion of the outer jacket material. Thus, with the electricity accumulation device according to the embodiment, expansion of the outer jacket material caused immediately after gas generation can be sensed accurately.

DESCRIPTION OF THE REFERENCE NUMERALS

1 ELECTRICITY ACCUMULATION DEVICE
10 ELECTRICITY ACCUMULATION ELEMENT
20 OUTER JACKET MATERIAL
21 UPPER SURFACE (EXPANSIVE SURFACE)
22 RECESSED PORTION
23 SEAL PORTION
30 DEFORMATION SENSOR
31 SUBSTRATE
32 SENSOR MEMBRANE
33a, 33b ELECTRODE
34a, 34b WIRE
35 COVER FILM
310 SENSOR PORTION
311 WIRING PORTION
40 DEVICE MAIN BODY
41 HOUSING
42 BAR MEMBER
43 BODY PORTION
44 LID PORTION
45a, 45b CUSHIONING MATERIAL
420 CURVED SURFACE PORTION
440 ATTACHMENT PORTION
450a, 450b SUPPORT RECESSED PORTION
50 DEFORMATION SENSOR
51 SUBSTRATE
510 SENSOR MEMBRANE
53a, 53b ELECTRODE
54a, 54b WIRE
55 COVER FILM
510 SENSOR PORTION
511 WIRING PORTION
800 SENSOR MEMBRANE
801 RESIN
802 CONDUCTIVE FILLER
803 CRACK
C1 CRACK
P CONDUCTIVE PATH

The invention claimed is:

1. An electricity accumulation device comprising:
an electricity accumulation element; an outer jacket configured to house the electricity accumulation element;
a deformation sensor disposed on an expansive surface of the outer jacket; and
a deformation input member that comprises a bar or a string member having a curved cross-sectional surface that abuts against the deformation sensor,
wherein the deformation sensor includes a substrate, a sensor membrane having a base material comprising an elastomer or a resin and conductive fillers that fill the base material at a filling rate equal to or more than 30% by volume, the sensor membrane being subjected to bending deformation in association with expansion of the outer jacket, the sensor membrane positioned on the substrate, and at least a pair of electrodes connected to the sensor membrane, the sensor membrane provided on an expansive side surface of the outer jacket, a three-dimensional conductive path provided in the sensor membrane by contact between the conductive fillers, an electric resistance is increased in association with an increase in an amount of deformation of the sensor membrane, and
the deformation input member is positioned on a substrate side of the deformation sensor so as to intersect a line that connects the pair of electrodes and is configured to press the sensor membrane together with the outer jacket in association with expansion of the outer jacket to increase an amount of bending deformation of the sensor membrane, and
the deformation sensor is configured to sense expansion of the outer jacket on the basis of variations in electric resistance associated with bending deformation of the sensor membrane, and
wherein the base material of the sensor membrane comprises a resin, and the sensor membrane comprises cracks that extend in a direction and are configured to break the conductive path when the sensor membrane is subjected to bending deformation.

2. The electricity accumulation device according to claim 1, wherein the sensor membrane is positioned to extend from one end to the other end of the expansive surface of the outer jacket.

3. An electricity accumulation device comprising:
an electricity accumulation element;
an outer jacket that houses the electricity accumulation element; and
a deformation sensor disposed on an expansive surface of the outer jacket, wherein
the deformation sensor includes: a sensor membrane having a base material that comprises an elastomer or a resin and conductive fillers that fill the base material at a filling rate equal to or more than 30% by volume, the sensor membrane being subjected to bending deformation in association with expansion of the outer material and at least a pair of electrodes connected to the sensor membrane, the expansive surface of the outer jacket includes a recessed portion, the sensor membrane is configured to be subjected to bending deformation along the recessed portion, a three-dimensional conductive path is provided in the sensor membrane by contact between the conductive fillers, and an electric resistance is increased in association with an increase in an amount of deformation of the sensor membrane, and the deformation sensor is configured to sense expansion of the outer jacket based upon variations in electric resistance associated with bending deformation of the sensor membrane, wherein the base material of the sensor membrane comprises a resin, and the sensor membrane comprises cracks that extend in a direction and are configured to break the conductive path when the sensor membrane is subjected to bending deformation.

4. An electricity accumulation device comprising:

an electricity accumulation element;

an outer jacket comprising a film member that is configured to house the electricity accumulation element; and a deformation sensor disposed on an expansive surface of the outer jacket, wherein the expansive surface of the outer jacket includes a seal portion at which end portions of the film member are affixed to each other, the deformation sensor includes a sensor membrane disposed on the expansive surface and the seal portion which is continuous with the expansive surface and has a base material comprising an elastomer or a resin and conductive fillers that fill the base material at a filling rate equal to or more than 30% by volume, the sensor membrane is configured to be subjected to bending deformation in association with expansion of the outer jacket material to cause the seal portion to stand upright, and at least a pair of electrodes connected to the sensor membrane, a three-dimensional conductive path is provided in the sensor membrane by contact between the conductive fillers, an electric resistance is increased in association with an increase in an amount of deformation of the sensor membrane, and the deformation sensor is configured to sense expansion of the outer jacket based upon variations in electric resistance associated with bending deformation of the sensor membrane, wherein the base material of the sensor membrane comprises a resin, and the sensor membrane comprises cracks that extend in a direction and are configured to break the conductive path when the sensor membrane is subjected to bending deformation.

* * * * *